June 26, 1951  T. L. KENDALL ET AL  2,558,654
STORAGE BATTERY VENT PLUG
Filed April 19, 1949

INVENTORS
THOMAS L. KENDALL
DONALD G. MAHONEY
LOUIS G. CROOKS
BY
THEIR ATTORNEYS

Patented June 26, 1951

2,558,654

UNITED STATES PATENT OFFICE 2,558,654

STORAGE BATTERY VENT PLUG

Thomas L. Kendall, Donald G. Mahoney, and Louis G. Crooks, Muncie, Ind., assignors to General Motors Corporation, Detroit, Mich., a corporation of Delaware Application April 19, 1949, Serial No. 88,382

2 Claims. (Cl. 136—178)

1

This invention relates to vent plugs for storage batteries and its object is to provide a vent plug of durable and economical construction which will permit the escape of gas accumulating in the battery and will block the entrance of liquid into the battery in case it is submerged. To accomplish this object, the plug comprises a body which can be screwed into the threaded filler opening of the battery cell cover and which has a wall providing a central vent hole and serving as a seat for a circular, flexible diaphragm having holes offset from the hole in the valve seat of the body. The plug body receives a cover having an annular flange which seats on the periphery of the diaphragm and holds it firmly against the body. The cover flange fits within a flange provided by the body and the cover is sealed to the body. The cover and the body provide a chamber above the diaphragm, and this chamber is vented by a hole through the flanges of the body and cover. Gas can escape from the battery cell through the valve seat and between the seat and the diaphragm, and through the holes in the diaphragm and through the hole in the flanges of the body and cover. If the battery cell should be submerged in water, for example, the diaphragm will be subjected to water pressure which causes the diaphragm to seat firmly upon the valve seat of the body and to block entrance of the water into the cell.

Further objects and advantages of the present invention will be apparent from the following description, reference being had to the accompanying drawings, wherein a preferred embodiment of the present invention is clearly shown.

Figure 1:
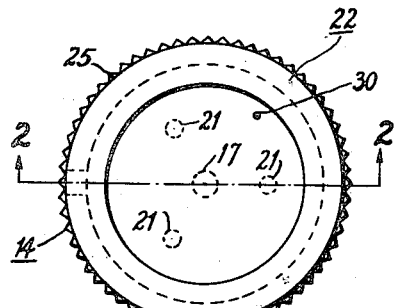
Fig. 1 is a plan view of the plug looking in the direction of arrow 1 of Fig. 2.
Figure 2:
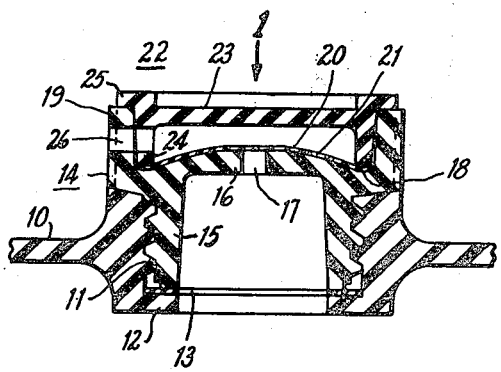
Fig. 2 is a sectional view on line 2—2 of Fig. 1.

A storage battery cell cover 10 provides a threaded opening 11 and a ledge 12 which may receive a washer 13. A plug body 14 having a threaded shank 15 is screwed into the threaded opening 11. The lower edge of the plug body engages the washer 13. Plug body 14 has a wall 16 having a central hole 17 and an upper surface which is generally convex. The convex surface merges with a concave annular surface 18. The wall 16 merges with an annular flange 19. The upper surface of the wall 16 receives a diaphragm 20 having a plurality of holes 21 spaced from the hole 17. The diaphragm is retained by a cap 22

2 having a wall 23 integral with an annular flange 24 nested within flange 19 of the body and having a circular flange 25 which is sealed to the flange 19 of the plug body by a suitable sealing compound. When the cap 22 is sealed in position, the flange 24 engages the periphery of the diaphragm and seals or holds it firmly against the surface 18. After sealing the cap 22 to the plug body 14, a hole 26 is drilled through both parts.

Figure 3:
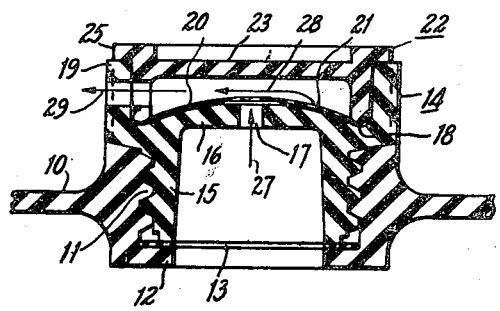
Fig. 3 is a view similar to Fig. 2, showing the diaphragm lifted by gas escaping from a battery cell.

When gas accumulates above the electrolyte in the battery cell, the gas presses against the underside of the center of the diaphragm 20 and lifts it as shown in Fig. 3, so that gas can escape through holes 17 and 21 as indicated by arrows 27, 28 and 29. If the battery becomes submerged under water, water will enter through the hole 26 into the space between the cover wall 23 and the diaphragm 20 and will force the latter against the plug body wall 16 and thus block the passage of water from the holes 21 to the hole 17. The plug parts are made of substances which are resistant to battery acid. The plug body and the cover may be made of a suitable plastic such as polystyrene and the diaphragm of a flexible plastic compound, such as one of the flexible vinylite compounds. The material which is used to seal the cover to the body should be such as will have a dissolving effect upon the substances of the parts to be sealed.

Since the hole 26 is drilled through the telescopically engaging flanges of the body and cover, preferably after they are assembled, maintenance of assembly before hole 26 is drilled is facilitated by provision of a small vent hole 30 in the cover to prevent compression of air between these parts during assembly.

While the embodiment of the present invention as herein disclosed, constitutes a preferred form, it is to be understood that other forms might be adopted.

What is claimed is as follows:

1. A storage battery vent plug for use with a storage battery which normally emits gas therefrom during use comprising a plug body having a normally horizontal wall and two annular flanges extending therefrom in opposite directions, the downwardly extending flange being threaded to screw into a threaded filler opening in a battery cell cover, a central hole in the wall, a resilient flexible diaphragm normally in seated contact with said wall and covering the central hole said diaphragm having an aperture therethrough positioned so as to be out of line with the central hole within said wall when the plug body and diaphragm are assembled, and a cover having a wall spaced from the diaphragm and an annular flange extending downwardly therefrom and nested within the upwardly extending flange of the body and engaging the peripheral portion of the diaphragm to hold it in normal contact with the apertured wall of the body, said cover having a circular flange seated upon the upwardly extending flange of the body and bonded thereto, and a duct for venting the space between the cover wall and the diaphragm said diaphragm being sufficiently resilient to be unseated from said wall by gas pressure within the battery whereby said pressure may be relieved through said central hole of the aperture and said duct for reducing internal pressure in the battery to substantially atmospheric pressure whereupon said diaphragm again seats against the wall to substantially seal the battery against ingress of the atmosphere.

2. A storage battery cell vent plug for use in connection with storage battery which normally gases during the use thereof; the combination comprising: a plug body having a normally generally horizontal wall with an aperture adjacent the center thereof, a pair of annular flanges extending from opposite sides of said wall, the downwardly extending flange including threads for attaching the plug to a battery cell, the upwardly extending flange forming a cavity around said horizontal wall aperture, a flexible, thin, resilient diaphragm adapted to fit into said cavity and cover said horizontal wall and the aperture therein, said diaphragm having vent means therethrough offset from said wall aperture, and a vented plug for fitting into said cavity and for holding said diaphragm in sealing contact with said wall aperture, whereby gas may be emitted from the battery cell by distortion of the diaphragm due to internal pressure and the atmosphere is sealed against ingress into said cell.

THOMAS L. KENDALL.
DONALD G. MAHONEY.
LOUIS G. CROOKS.

REFERENCES CITED

The following references are of record in the file of this patent:

UNITED STATES PATENTS

| Number | Name | Date |
|---|---|---|
| 1,907,911 | Wallace et al. | May 9, 1933 |
| 2,436,465 | Wilson | Feb. 24, 1948 |

FOREIGN PATENTS

| Number | Country | Date |
|---|---|---|
| 639,892 | France | July 2, 1928 |
| 706,854 | France | June 30, 1931 |